United States Patent Office 2,779,735
Patented Jan. 29, 1957

2,779,735

LOW FLUID LOSS COMPOSITION

Jack L. Brown, Ponca City, Okla., and Mary M. Landers, Dallas, Tex., assignors to Continental Oil Company, Ponca City, Okla., a corporation of Delaware Application April 18, 1956, Serial No. 579,049

25 Claims. (Cl. 252—8.55)

This invention relates to the treatment of fluids used in well working operations such as drilling and hydraulic fracturing. This application is a continuation-in-part of our copendng application entitled "Low Liquid Loss Fluids," Serial No. 464,624, filed October 25, 1954, now abandoned.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid, whereby the propping material is carried into the fracture with the fracturing fluid. After the fracture has been extended to the extent desired, the pressure in the well bore is decreased and the fracturing fluid flows back into the well bore. At least a portion of the propping material is deposited in the fracture for maintaining the fracture open and enhancing the flow of formation fluids through the fracture into the well bore.

The type of fracture obtained is dependent primarily upon the penetrating characteristics of the fracturing fluid. That is, a low penetration fluid usually gives a vertical fracture (ordinarily the most desirable), and a high penetrating fracturing fluid usually gives a horizontal fracture (frequently along weak bedding planes in the formation, which is undesirable). Therefore, a primary concern in the art has been to reduce the penetrating characteristics (usually called the fluid loss) of fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids. The usual solution is to incorporate a large quantity of oil-insoluble materials, such as blown asphalt and rubber, in an oil carrier for literally plastering the face of a formation by an accumulation of the plastering material. These large amounts of plastering materials require correspondingly large amounts of dispersing agents and gelling agents to maintain the plastering materials in suspension under the various operating conditions. Fracturing fluids made in this manner undoubtedly attain good fluid loss properties, but the cost thereof is unnecessarily high and fluid invariably has a high viscosity. Also, the plastering materials heretofore used have relatively large particle sizes, thereby necessitating a large amount of the material to effectively seal a formation face.

Similar concepts have been used in making drilling fluids.

A recent development in the art of making fracturing fluids and fracturing fluid additives is shown in United States Patent No. 2,645,291, issued to Vandeveer Voorhees on July 14, 1953. This patent teaches the production of a fracturing fluid using a hydrocarbon carrier with finely divided oil-insoluble solids suspended in the carrier. The solids range in size from 100 to 400 mesh and from .5 to 10 pounds of the solids are incorporated in each gallon of fracturing fluid to obtain a high final viscosity.

The present invention contemplates a well-working, fluid composition (such as used in fracturing and drilling operations) using a greatly reduced amount of oil-insoluble solids, as compared to the amounts required in prior compositions. We contemplate using only a small amount of the solids, with a substantial portion of the solids having a particle size less than 2 microns, which, in cooperation with a minor amount of agglutinant, form a substantially fluid impervious seal on the face of a formation. The small amount of solids used requires a correspondingly small amount of a dispersing agent to maintain the solids in suspension in an oil carrier, and, in some oils, no dispersing agent is required. Furthermore, the present basic composition has a relatively low viscosity, which can be increased as desired by merely adding the presently well known gelling agents.

An important object of this invention is to provide an economical well-working, low fluid loss composition.

Another object of this invention is to provide a basic low fluid loss composition having a low viscosity, wherein the viscosity may be easily increased as desired.

A further object of this invention is to provide a low fluid loss composition containing only a minor amount of solid material.

A more general object of this invention is to facilitate and economize well-working operations.

Another specific object of this invention is to provide a low fluid loss composition comprising an oil carrier and only a minor amount of additive for reducing the fluid loss properties of the composition.

Other objects and advantages of the invention will be evident from the following description, when read in conjunction with the accompanying drawings, which illustrate our invention.

Figure 1:
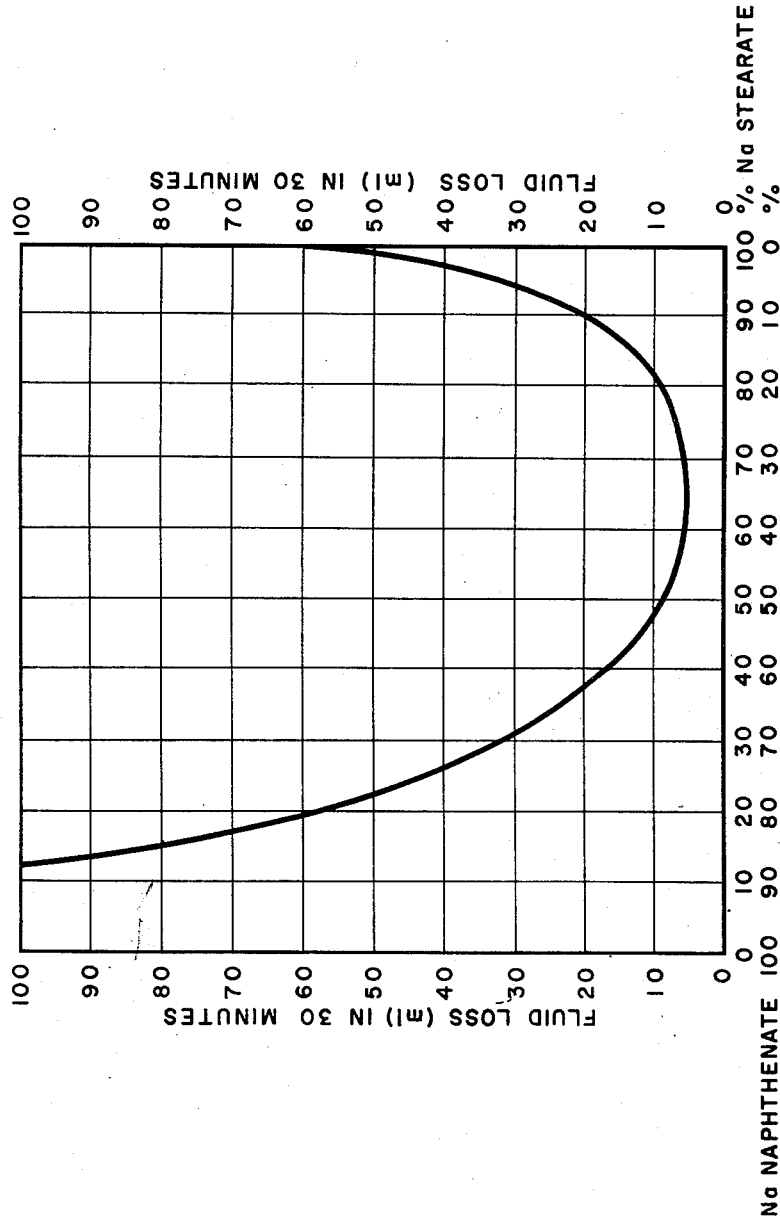
Figure 1 is a curve illustrating the fluid loss properties of a composition produced in accordance with this invention.

Stated broadly, the present invention may be defined as a method of sealing a porous subsurface formation traversed by a well bore which comprises depositing on the faces of the formation with which liquids in the well bore have contact, a layer of finely divided solids wherein the portion of said layer adjacent the formation comprises solid particles, about 35 percent of which vary in a size from .005 to 2 microns, and co-depositing with the solid a gelatinous material serving as an agglutinant.

Before proceeding with specific examples illustrating our invention, it may be well to indicate in general the nature of the materials required in the process.

PETROLEUM OIL

The petroleum oil which may be used as the carrier or vehicle in our improved fracturing and drilling fluid may be substantially any petroleum hydrocarbon liquid. For example, we may use crude oil which is normally available in the vincinity of the well-working operation. Such crude oils range in viscosity from 5 to 100 centipoises, but usually between 15 to 25 centipoises taken at a temperature of 70° F. In addition, refined petroleum products may be used, such as kerosene, pale oil, diesel fuel, fuel oil, etc.

OIL-INSOLUBLE SOLIDS

In general, any oil-insoluble solid which may be obtained in finely divided form may be used. However, we prefer one or more of the following solids because of their availability and economy: calcium carbonate, calcium chloride, calcium sulfate, carbon black, carboxy methyl cellulose, fuller's earth and similar products, magnesium or barium sulfate, mica, Portland cement, sodium borate, sodium carbonate, sodium chloride, sodium silicate, sodium sulfate, spent catalyst and walnut shells.

OIL-SOLUBLE DISPERSING AGENT

A variety of oil-soluble, ionic surface active agents may be used as the dispersing agent in the process of this invention. The sulfonates, sulfates, phenolic compounds, organic phosphorus compounds, phosphorus sulfide treated olefins, and metal soaps of carboxylic acids are typical anionic surface active agents.

Sulfonates

Sulfonates which are suitable are oil-soluble and include the alkali metal and alkaline earth metal soaps of akyl sulfonic acid, alkaryl sulfonic acid, and the so-called mahogany or petroleum sulfonic acids, and the like. The mahogany soaps include particularly the oil-soluble aromatic sulfonates from petroleum. Many of the aromatic sulfonates have cycloalkyl (i. e., naphthenic) groups in the side chains attached to the benzene ring. The mahogany soaps may include non-aromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totalling only about 18 carbon atoms. To attain the requisite oil solubility, therefore, requires that the hydrocarbon portion of the sulfonate have a molecular weight between about 350 and 1,000. Preferably this molecular weight is between 400 and 700. Particularly useful sulfonates include the alkali and alkaline metal diwaxbenzene sulfonates, diwaxtoluene sulfonates, and polydodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dilauryl beta-naphthol sulfonates, dicapryl nitro-naphthalene sulfonates, unsaturated paraffin wax sulfonates, hydroxy substituted paraffin wax sulfonates, tetra-amylene sulfonates, mono- and poly-chlorosubstituted paraffin wax sulfonates, nitrosoparaffin wax sulfonates; cycloaliphatic sulfonates such as lauryl- cyclo-hexyl sulfonates, mono- and poly-wax substituted cyclo-hexyl sulfonates, and the like. The expression "petroleum sulfonate" is intended to cover all sulfonates derived from petroleum products.

A preferred oil-soluble sulfonate is the product produced by neutralizing postdodecylbenzene overhead sulfonic acid with sodium hydroxide or other base. PDB overhead sulfonic acid is the acid produced by sulfonating PDB-OH Physical properties of PDB-OH before sulfonating are as follows:

| | |
|---|---|
| Specific gravity at 48° C | 0.866 |
| Average molecular weight | 300 |
| A. S. T. M. (.D–158 Engler): | |
| I. B. P ° F | 647 |
| 5 ° F | 625 |
| 10 ° F | 630 |
| 50 ° F | 656 |
| 90 ° F | 710 |
| 95 ° F | 730 |
| F. B. P ° F | 738 |
| Refractive index | 1.4902 |
| Viscosity at 100° F., SUS | 110 |
| Bromine number | .40 |

Phenolic compounds

The phenolic organic comopunds which may be used are the free oil-soluble phenolic compounds or the metal phenates thereof. Oil-solubility is imparted to such phenolic compounds by the presence in the molecule of at least nine aliphatic carbon atoms. Specific examples are: 3,5,5 - trimethyl - n - hexyl phenol, n-decyl phenols, cetyl phenols, nonyl phenols, and the like; alkaryl substituted phenols such as alkyl-phenyl phenols; polyhydroxy alkyl-aromatic compounds such as 20-carbon alkyl resorcinol, or polyhydroxy alkyl-benzenes, such as, for example, octyl catechol, tri-iso-butyl pyrogallol, and the like; mono-hydroxy alkyl-naphthalenes such as 12-carbon alkyl alpha naphthol, and the like. Alkyl substituted phenol sulfides containing at least 5-alkyl carbon atoms such as iso amyl or nonyl phenol disulfide and the like may be used.

Organic phosphorus compounds

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, mono-wax phosphorus acids, mono-octadecyl phosphorus acid, mono-dodecyl phosphorus acid, methyl cyclohexyl phosphite, capryl phosphite, dicapryl phosphite, zinc monowaxbenzene phosphonate, zinc dodecylbenzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(iso-propyl-phenyl) monothiophosphoric acids, and the like, and the oil-soluble salts thereof.

Phosphorus sulfide treated olefins

The phosphorus sulfide treated olefins and their oil-soluble metal salts which are suitable for use include those customarily used in lubricating oil formulations as corrosion inhibitors and/or detergents. Specifically, they include the potassium-polyisobutylenephosphorus sulfide products described by U. S. Patent 2,316,080 issued on April 6, 1943, to Loane and Gaynor and a similar material containing no metal made by addition of a phosphorus sulfide to wax olefins as described in U. S. Patent 2,516,119 issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

Metal soaps of carboxylic acids

Examples of specific soaps which are preferred for use because of cost and availability include metal soaps of naphthenic acids and the higher fatty acids.

Suitable naphthenic acids include substituted cyclopentane mono- and di-carboxylic acids and cyclohexane mono- and di-carboxylic acids having at least about 15 carbon atoms for oil solubility, for example, cetyl cyclohexane carboxylic acids, dioctyl cyclopentane carboxylic acids; and dilauryl deca-hydronaphthalene carboxylic acids, and the like, and oil-soluble salts thereof.

Suitable oil-soluble fatty and radicals include those in which there are present at least about 8 carbon atoms. The barium salts of the unsaturated and branched chain acids being oil-soluble with fewer aliphatic carbon atoms than the saturated acids. Specific examples are: 2-ethyl hexoic acid, linoleic acid, and the like. Substituted fatty acids which are useful may include chloro-stearic acids, ricinoleic acids, and the like.

*Cationic oil-soluble surface active agents*

Suitable cationic oil-soluble surface active agents for use in the process of our invention include: a substituted oxazoline, obtainable from Commercial Solvents Corporation under the trade name "Alkatergl C, O, and OX"; heterocyclic tertiary amine

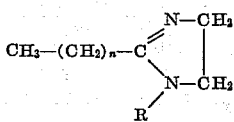

obtainable from Alrose Chemical Company under the trade name "Alro amines Ci, O, and S"; a secondary fatty acid amine, obtainable from Armour and Company under the trade name "Armeen 2C and 2HT"; quaternary ammonium compounds of the formula $$RR'\!-\!N\!-\!(CH_3)_2Cl$$

obtainable from Armour and Company under the trade name "Arquad 2C and 2HT"; and a modified cationic agent, obtainable from Alrose Chemical Company under the trade name "Detergent I-160."

AGGLUTINANT

In general cationic, anionic and nonionic agglutinants may be used. As used herein, and in the appended claims, the term "agglutinant" may be defined as an oil-insoluble surface active agent which, when dispersed in oil, will form a gelatinous precipitate in the presence of a small amount of water. This will include straight chain compounds containing from 5 to 24, preferably 5–18 carbon atoms, and branched chain compounds containing from 5 to 18 carbon atoms. Particularly effective agglutinants include: sodium caproate, sodium oleate, sodium stearate, sodium dodecylbenzene sulfonate and sodium pelargonate. Sodium dodecylbenzenesulfonate is the final product produced by sulfonating DB followed by neutralization with sodium hydroxide. Physical properties of DB are as follows:

Specific gravity at 16° C _____ 0.8742
Average molecular weight _____ 232
A. S. T. M. (.D-148 Engler):
   I. B. P _____ °F __ 535
   5 _____ °F __ 545
   10 _____ °F __ 550
   50 _____ °F __ 560
   90 _____ °F __ 580
   97 _____ °F __ 592
   F. B. P _____ °F __ 603
Refractive index at 20° C _____ 1.4885
Viscosity at 20° C _____ centipoises __ 14
Bromine number _____ 0.16

We may also use polyethylene oxide derivatives of alcohols, fatty acids, amines, amides, and phenols having an amount of ethylene oxide to solubilize the derivative in water. Generally speaking, the alcohol fatty acid, amine, amide, or phenol may be reacted with about 1 to 2.5 times its weight of ethylene oxide to obtain a hydrophylic oil-insoluble surface active agent which will form a gelatinous precipitate in the presence of a small amount of water.

Probably the most important consideration in the preparation of a fracturing or drilling fluid in accordance with this invention is the particle size of the oil-insoluble solids. We have found that the objectives of this invention are attained by dispersing a minute quantity of a finely divided oil-insoluble solid in a petroleum oil. As to size (largest dimension of the particle), the particles may range from 0.005 to 2 microns. Generally, we prefer to use particles the sizes of which may vary over a somewhat more limited range, namely 0.01 to 2 microns. It is not necessary, however, that the dispersed solid consist entirely of particles having sizes within these limits, as a suitable low fluid loss composition can be prepared wherein all or only a part of the dispersed solids consist of particles the sizes of which vary within the foregoing limits. A product of the latter category is preferred, as such a product is more economical and is available in greater quantities than the former. Regardless of which product is used, we have found that a satisfactory low fluid loss composition is obtained by using a sufficient quantity of the solid to give a composition having a concentration of at least .0025 pound of particles the sizes of which fall within either of the foregoing size limitations per gallon of oil. Generally, we prefer to use a quantity of solids such that the concentration of particles within either of the foregoing size limitations is about .05 pound per gallon of oil. Generally speaking, the total amount of solid used should not exceed .20 pound per gallon of oil, with at least .0025 pound of the solid (and preferably about 35 percent of the solid) having a particle size from .005 to 2 microns. This amount of solid provides an economical composition having good fluid loss properties, and the viscosity of the composition is not unduly high.

Either water-soluble or water-insoluble finely divided oil-insoluble solids may be used. However, we prefer water-soluble solids since they are easily removed from the well, as by water-washing, if such a result is desirable.

The following examples (Tables I and II) illustrate the marked effect of particle size on the fluid loss properties of a fracturing fluid. In each example, 1.44 grams of ball-milled sodium sulfate or calcium chloride was suspended in 200 cc. of kerosene by the use of 0.72 gram of sodium postdodecylbenzene sulfonate. Each suspension was mixed for 10 minutes with a common malt mixer and then allowed to settle in a glass tube to determine the particle size of the solid particles by means of Stokes law. 100 cc. of the suspension containing the desired particle sizes was selected for each of the tests, and 0.12 gram of sodium dodecylbenzene sulfonate added to the selected suspension. The selected suspension was then mixed for an additional 10 minutes to disperse the sodium dodecylbenzene sulfonate, and the fluid loss of the suspension was determined by the Standard Field Procedure for Testing Drilling Fluids, Section IV, A. P. I. Test RP29, May 1950, using No. 987 Baroid filter paper.

TABLE I

[Dispersed solid—sodium sulfate]

| Size Range (microns) | Fluid Loss (cc./20 min.) |
|---|---|
| 0.005–2 | 6.5 |
| 3–8 [1] | 20 |
| 8–20 [1] | 38 |

[1] Each of these samples also contained a minute quantity of finer solids, but substantially less than .0025 pound/gallon of kerosene.

TABLE II

[Dispersed solid—calcium chloride]

| Size Range (microns) | Fluid Loss (cc./20 min.) |
| --- | --- |
| 0.005–2 | 5.8 |
| 3–8 [1] | 21 |
| 8–20 [1] | 43 |

[1] Each of these samples also contained a minute quantity of finer solids, but substantially less than .0025 pound/gallon of kerosene.

From Tables I and II, it will be observed that the use of solid particles less than 2 microns in size materially decreases the fluid loss of a fracturing fluid. Many similar tests have been run with the other preferred oil-insoluble solids described above in the section "Oil-insoluble solids" and, in each instance, comparable results were obtained. Although the solid particles in the examples of Tables I and II (which gave the best fluid loss properties) were all in the size range of from 0.005 to 2 microns, it will be understood that substantially the same results are obtained when the solid also comprises larger particles along with the fine particles. Such an example is illustrated in Table III, where the test was run in substantially the same manner as previously described.

TABLE III

[Dispersed solid—calcium chloride]

| Size Range (microns) | Fluid Loss (cc./20 min.) |
| --- | --- |
| 0.005–2 | 5.8 |
| 0.005–5 | 5.5 |
| 0.005–10 | 5.8 |

Only a sufficient amount of oil-soluble dispersing agent need be used to disperse the oil-insoluble solids in the petroleum oil. We have found that from about .015 to .08 pound of dispersing agent per gallon of petroleum oil is sufficient. A larger amount of dispersing agent, up to one pound per gallon or even higher, may be used. However, these larger amounts are not desirable since the cost of the fracturing or drilling fluid is increased, and no increased benefits are obtained.

In the event the petroleum oil being used contains a naturally occurring or previously incorporated oil-soluble dispersing agent, the amount of oil-soluble dispersing agent added to adapt the oil to a fracturing or drilling fluid may be proportionately reduced. In some oils, the oil-soluble dispersing agent may be dispensed with entirely.

It has been found that only from .01 to .08 pound of oil-insoluble surface active agent (agglutinant) per gallon of petroleum oil is required to produce a satisfactory low liquid loss fluid.

Figure 2:
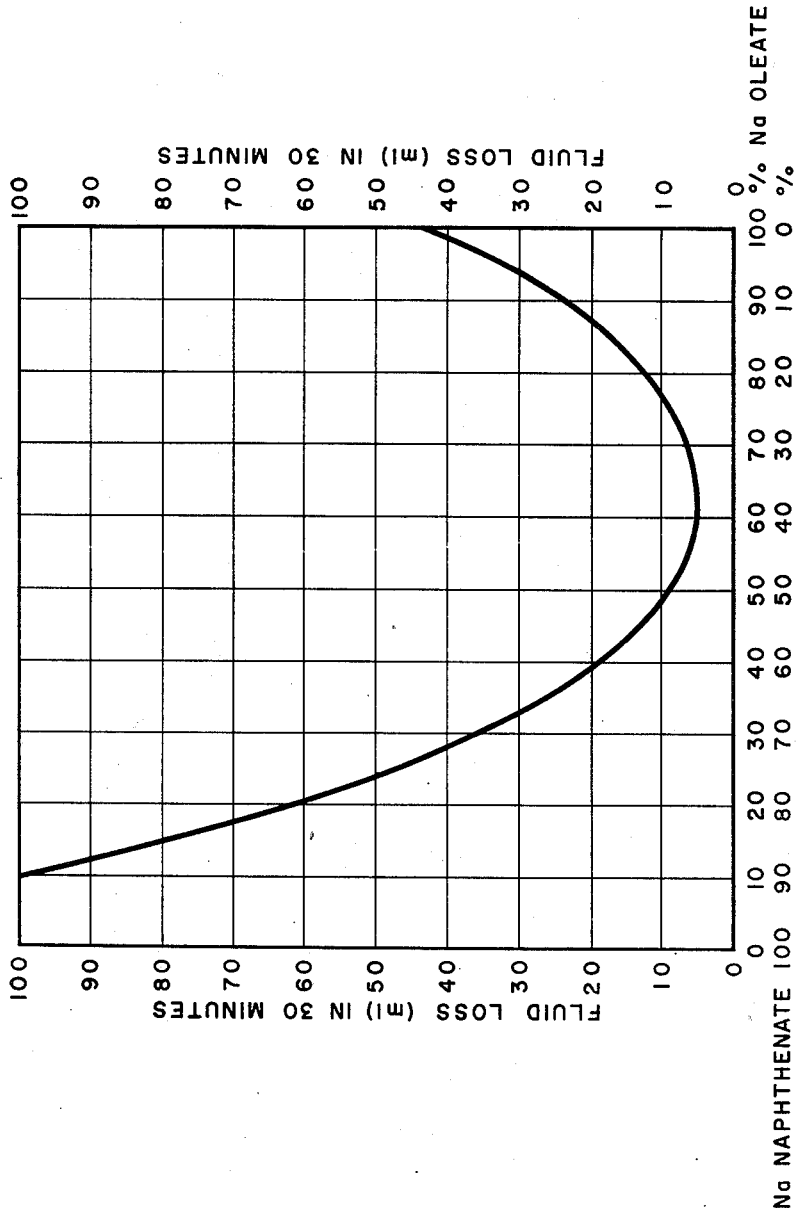
Figure 2 is a curve similar to Figure 1 using a different low fluid loss composition.

Specific examples of variations in the relative amounts of oil-soluble dispersing agents and agglutinants are illustrated in Figs. 1 and 2. The curves of Figs. 1 and 2 were obtained by running the standard fluid loss test identified above, using kerosene as the petroleum oil and a total of 0.2 pound of additive per gallon of kerosene, with 50% of the additive being sodium sulfate (as the finely divided solid) in each run. In Fig. 1, the oil-soluble dispersing agent was sodium naphthenate having a molecular weight of 320, and the agglutinant was sodium stearate, with the amounts of naphthenate and stearate being varied as indicated at the bottom of the figure. Since a fluid loss of 10 cc. or less is considered excellent, it will be observed that in this specific example the oil-soluble dispersing agent varied from 19% (.019 lb.) to 52% (.052 lb.), and the agglutinant varied from 48% (.048 lb.) to 81% (.081 lb). It will also be noted that the agglutinant alone gave a fluid loss of about 60 cc.

Similar results are shown in Fig. 2, where the oil-soluble dispersing agent was again sodium naphthenate (varying from 25% (.025 lb.) to 50% (.050 lb.)) and the agglutinant was sodium oleate (varying from 50% (.050 lb.) to 75% (.075 lb.)). The agglutinant alone gave a fluid loss of about 42 cc. Similar tests were run using an additive comprising 50% sodium sulfate (as the finely divided solid) and 50% agglutinant, along with approximately 0.35% water based on the total weight of the additive and the petroleum oil (kerosene). In the last-mentioned tests, sodium dodecylbenzene sulfonate as the agglutinant gave a standard fluid loss of about 12 cc., and sodium lauryl sulfate as the agglutinant gave a standard fluid loss of about 10 cc.

We have found that the viscosity of the low fluid loss composition of this invention varies directly as the amount of additive used. When the optimum quantity of the additive is used (considering both effectiveness and economics), the viscosity of the final composition will be less than 50% greater than the original viscosity of the petroleum oil. If the particular operator using the composition desires a higher viscosity fracturing fluid, any desired amount of well known gelling agents may be used, such as sodium oleate formed in situ by the addition of oleic acid and then sodium hydroxide to the predominantly oil composition, as is well known in the art.

A preferred embodiment of this invention (when used in fracturing) includes the use of sodium postdodecylbenzene sulfonate as the oil-soluble dispersing agent; sodium sulfate as the finely divided solid, and sodium dodecylbenzene sulfonate as the agglutinant, with each of these compounds being in dry form for convenient mixing with a petroleum oil at the site of the well working operation.

An operable additive, with the required particle size of the finely divided solid, may be obtained by crutching and then evaporating the water from a slurry consisting of approximately 15% oil-soluble dispersing agent, 30% solid, 5% agglutinant and 50% water. As a specific example of preparing the preferred additive of this invention, 300 grams of a slurry consisting of 42.4% sodium postdodecylbenzene sulfonate, 5.1% sodium sulfate, 2.5% oil and 50.0% water may be mixed with 97.5 grams of a slurry consisting of 43.5% sodium dodecylbenzene sulfonate, 5.0% sodium sulfate, 0.68% oil and 51.5% water. 231.6 grams of water are added to the slurries during mixing and then 234.4 grams of commercial anhydrous sodium sulfate are added slowly and the mixing is continued for ten minutes. All of the mixing is done at a temperature of 55° C. The slurry obtained by this mixing procedure is then dried on a common drum dryer using a drum temperature of 307° F., speed of 4.2 R. P. M. and steam pressure of 70 p. s. i. The resulting dried product is then ready for use as the preferred additive of this invention, and about 35% of the sodium sulfate, when the product is incorporated in a petroleum oil, will consist of particles varying in size from about 0.005 to 2 microns.

The desired particle size may also be obtained by dissolving the solid in a solvent and then dispersing the solution in the oil, as by emulsification, and then evaporating the solvent. Or by forming a solution of the oxide or hydroxide, dispersing such solution in the oil and then acid treating the mass, as by blowing with carbon dioxide, and precipitating the fine insoluble solids in situ and removing the solids.

Although we do not wish to be limited to any particular theory, it is believed that the mechanics or operation of the composition of this invention is such that the oil-soluble dispersing agent functions solely to suspend the finely divided oil-insoluble solid in the petroleum oil. When the composition is placed under pressure against a subsurface formation (such as the walls of a well bore), a minor portion of the petroleum oil is initially forced into the pores of the formation. As this oil escapes into the formation, a portion of the oil-insoluble solid particles enters the formation pores and become wedged in the pores adjacent the formation surface, as well as deposited on the surface of the formation. The agglutinant forms a gelatinous-like layer or blanket on top of and between the deposited solids to provide a barrier at the formation surface which is substantially impervious to further flow of oil into the formation.

Generally speaking, a small amount of water (for example, 0.33% by weight based on the petroleum oil) facilitates the action of the fluid loss composition. It will be observed that this action follows the above-described theory, in that a small amount of water should assist in the precipitation of the agglutinant into a gelatinous-like layer or blanket. However, when an excessive amount of water is used, the agglutinant goes into solution in the water and the effectiveness of the composition is decreased.

As an example of the minute amount of solid required in some oils, .012 pound of the preferred additive of this invention (which included 60 percent, or .0072 pound of sodium sulfate) per gallon of oil was incorporated in a California crude (known as Turnball crude) and the resulting composition gave a standard fluid loss of 5 cc. when tested as described above. Since about 35% of the solid in the preferred additive consists of particles varying from about .005 to 2 microns, it will be seen that only about .0025 pound of the fine particles (between .005 and 2 microns) was used and a very good fluid loss obtained.

As a practical application of our invention, an oil well was fractured using our low liquid loss fluid. In this test three barrels of crude oil containing 0.4 pound of an additive (prepared by mixing 3 parts of sodium postdodecylbenzene overhead sulfonate, 1 part of sodium dodecylbenzene sulfonate, and 6 parts of sodium sulfate) per gallon of oil was first added to the well after which crude oil containing 0.2 pound of the same additive and 1 pound of sand per gallon of oil was pumped into the well until fracturing was completed. For comparison purposes an offset well in the same formation was fractured using a conventional viscous fracturing fluid. The results are tabulated below.

| Fracturing Fluid | Average Injection rate, bbls./min. | Maximum surface pressure, p. s. i. | Maximum bottomhole pressure, p. s. i. | Volume fracturing fluid, gallons | Production increase, Percent |
|---|---|---|---|---|---|
| Low Liquid Loss Fluid of our Invention | 3 | 2,300 | 3,665 | 2,000 | 600 |
| Conventional Fracturing Fluid | 2.5 | 2,875 | 3,820 | 5,000 | 400 |

These data demonstrate that only about 40% as much oil is used in our process as is required in the conventional process. Furthermore, the production rate of the well was increased by 600 percent as compared to 400 percent where the well was fractured by the conventional viscous fracturing fluid.

As another practical application of our invention, an oil well was completed using our low liquid loss fluid as a drilling mud. In this test, pipe was cemented on top of the pay formation and the conventional drilling mud displaced from the hole. Five hundred barrels of drilling fluid were prepared by mixing 0.2 pound of an additive (prepared by mixing 3 parts of sodium postdodecylbenzene overhead sulfonate, 1 part of sodium dodecylbenzene sulfonate and 6 parts of sodium sulfate) per gallon of crude oil. This drilling fluid had a fluid loss of 3 cc. as determined in accordance to the Standard Field Procedure for Testing Drilling Fluids, Section IV, API Test RP29, May 1950. It was used successfully to drill the cement plug and complete the well to total depth.

No trouble was experienced in the drilling operation and on completion, the well came in readily without the necessity of stimulation procedures. The use of the new drilling fluid thereby eliminated several days of drilling rig time which are ordinarily required in swabbing operations to bring in offset wells which were drilled using conventional water base drilling muds.

The fluid loss data listed below were determined in accordance to the Standard Field Procedure for Testing Drilling Fluids, Section IV, API Test RP29, 1950. In all examples the total amount of additive used was equal to 0.2 pound per gallon of kerosene.

TABLE IV

| Example | Additive | Fluid loss, ml./30 min. |
|---|---|---|
| A | None | ∞ |
| B | 0.076 lb. Na Naphthenate<br>0.024 lb. Na Caproate<br>0.10 lb. Na$_2$SO$_4$ | 40 |
| C | 0.076 lb. Na Naphthenate<br>0.024 lb. Na Peloorgonate<br>0.10 lb. Na$_2$SO$_4$ | 8 |
| D | 0.076 lb. Na PDB-OH<br>0.024 lb. Brij 35<br>0.10 lb. Na$_2$SO$_4$ | 11 |

Brij 35 is the trade name of a condensation product of lauryl alcohol and ethylene oxide obtainable from the Atlas Powder Company.

In the following examples the total amount of the additive used was equal to 0.1 lb. per gallon of kerosene. The testing procedure was the same as that employed in obtaining the data of Table IV.

TABLE V

| Solid | Sodium PDB OH Sulfonate, Percent | Na DB Sulfonate, Percent | Solid, Percent | Fluid Loss, ml./30 min. |
|---|---|---|---|---|
| Mica | 42 | 28 | 30 | 16 |
| Do | 30 | 20 | 50 | 43 |
| Tuf Plug [1] | 30 | 20 | 50 | 44 |
| Do.[1] | 42 | 28 | 30 | 39 |
| Portland Cement | 42 | 29 | 29 | 8.5 |
| Do | 62 | 17 | 21 | 30 |
| Calcium Acetate | 40 | 20 | 40 | 16 |
| Barium Sulfate | 40 | 20 | 40 | 11 |
| Sodium Bicarbonate | 40 | 20 | 40 | 7 |
| Oyster Shell | 40 | 20 | 40 | 18 |
| Calcium Chloride | 40 | 20 | 40 | 35 |
| Sodium Sulfate | 40 | 20 | 40 | 15 |
| Bentonite | 40 | 20 | 40 | 15 |
| Ammonium Nitrate | 40 | 20 | 40 | 23 |
| Magnesium Sulfate | 40 | 20 | 40 | 11 |
| Sodium Chloride | 40 | 20 | 40 | 14 |
| Sand | 40 | 20 | 40 | 20 |
| Aluminum Oxide | 40 | 20 | 40 | 14 |
| Lead Oxide | 30 | 20 | 50 | 18 |
| Talc | 40 | 20 | 40 | 13 |
| Bentonite | 60 | 10 | 30 | 20 |
| Sodium Carboxy Methyl Cellulose | 55 | 20 | 25 | 15 |
| Carbon | 67 | 23 | 10 | 26 |
| Do | 75 | 18 | 7 | 17 |
| Sodium Bicarbonate | 40 | 20 | 40 | 15 |
| Blown Asphalt | 30 | 10 | 60 | 15 |

[1] Tuf Plug is the trade name for ground walnut hulls obtainable from Cherokee Laboratories.

All of the above-mentioned materials were specially treated, or their manufacture controlled, so that the particle size distribution therein was such that in the quantities used, they contributed the amount or quantity of particles in the range below 2 microns required by this invention. These data demonstrate that almost any oil-insoluble solid may be employed with satisfactory results provided the particles fall within the size limitations previously pointed out.

From the foregoing it will be apparent that the present invention provides an economical, low fluid loss composition for well-working operations, such as fracturing and drilling. The present composition contains only a minor amount of solid material, and the final viscosity of the basic composition will be relatively low. However, the viscosity may be easily increased as desired. It will also be apparent that the present invention generally economizes and facilitates well-working operations.

Changes may be made in the precise compositions and combinations shown in the specific examples without departing from the spirit and scope of the invention as set forth in the appended claims.

We claim:

1. A low liquid loss composition comprising: a major portion of petroleum oil having dispersed therein; a minor amount of oil-insoluble finely divided solids of such fineness as to provide at least about .0025 pound per gallon of oil of particles varying in size from about 0.005 to 2 microns; and a minor amount, at least .01 pound per gallon of oil, of an "agglutinant."

2. A low liquid loss composition comprising: a major portion of petroleum oil having dispersed therein; a minor amount, at least 0.0072 pound per gallon of oil, of an oil-insoluble finely divided solid of such fineness that about 35 percent of the particles vary in size from about 0.005 to 2 microns; and a minor amount, at least .01 pound per gallon of oil, of an "agglutinant."

3. A low liquid loss composition comprising: a major portion of petroleum oil having dispersed therein; not more than about .20 pound per gallon of said oil of an oil-insoluble finely divided solid of such fineness as to provide at least about .0025 pound per gallon of oil of particles varying in size from about 0.005 to about 2 microns; and a minor amount, at least .01 pound per gallon of oil, of an "agglutinant."

4. A low liquid loss composition comprising: a major portion of petroleum oil having dispersed therein; a minor amount of oil-insoluble finely divided solids of such fineness as to provide at least about .0025 pound per gallon of oil of particles varying in size from about 0.005 to 2 microns; a minor amount of an oil-soluble dispersing agent sufficient to hold said oil-insoluble solids in suspension in the oil; and a minor amount, at least .01 pound per gallon of oil, of an "agglutinant."

5. A low liquid loss composition comprising: a major portion of petroleum oil having dispersed therein; a minor amount, at least 0.0072 pounds per gallon of oil, of an oil-insoluble finely divided solid of such fineness that about 35 percent of the particles vary in size from about 0.005 to 2 microns; a minor amount of an oil-soluble dispersing agent sufficient to hold said oil-insoluble solids in suspension in the oil; and a minor amount, at least .01 pound per gallon of oil, of an "agglutinant."

6. A low liquid loss composition comprising: a major portion of petroleum oil having dispersed therein; not more than about .20 pound per gallon of said oil of an oil-insoluble finely divided solid of such fineness as to provide at least about .0025 pound per gallon of oil of particles varying in size from about 0.005 to about 2 microns; a minor amount of an oil-soluble dispersing agent sufficient to hold said oil-insoluble solids in suspension in the oil; and a minor amount, at least .01 pound per gallon of oil, of an "agglutinant."

7. A composition as defined in claim 1 characterized further in that the oil-insoluble solid is water-soluble.

8. A composition as defined in claim 1 characterized further in that the oil-insoluble solid is water-insoluble.

9. A composition as defined in claim 4 characterized further in that the minimum amount of the oil-soluble dispersing agent is .015 pound per gallon of petroleum oil.

10. A composition as defined in claim 4 characterized further in that the amount of dispersing agent is from about .015 to .06 pound per gallon of petroleum oil.

11. A composition as defined in claim 2 characterized further in that a total of 0.2 pound of said finely divided solid per gallon of petroleum oil is dispersed in said petroleum oil.

12. A low fluid loss composition comprising a major portion of petroleum oil having dispersed therein; .0025 pound of an oil-insoluble finely divided solid per gallon of petroleum oil, the sizes of the individual particles varying from 0.01 to 2 microns, an oil-soluble dispersing agent for suspending said solid in said oil, and from 0.01 to 0.06 pound of an "agglutinant" per gallon of petroleum oil.

13. A low liquid-loss additive for petroleum oil comprising a finely divided solid of which 5 parts comprises particles the sizes of which range from 0.005 to 2 microns, at least 1.5 parts of an oil-soluble dirpersing agent, and at least 1 part "agglutinant," wherein said finely divided solid is obtained by evaporative precipitation from a slurry of water, said solid, said "agglutinant" and said dispersing agent.

14. A low fluid loss composition comprising a major portion of petroleum oil having dispersed therein 0.1 pound of finely divided sodium sulfate per gallon of petroleum oil, with a sufficient portion of the sodium sulfate particles being less than 2 microns in size to reduce the fluid loss of the composition to less than 44 ccs. in thirty minutes as determined by the Standard Field Procedure for Testing Drilling Fluids, Section IV, API Test RP29, May 1950, sodium postdodecylbenzene sulfonate for suspending the sodium sulfate in the petroleum oil, and at least 0.01 pound of sodium dodecylbenzene sulfonate per gallon of petroleum oil.

15. A low fluid loss composition as defined in claim 14 characterized further in that at least .0025 pound of the sodium sulfate per gallon of oil have a particle size ranging from 0.005 to 2 microns.

16. A low fluid loss composition as defined in claim 14 characterized further in that about 35 percent of the sodium sulfate has a particle size ranging from 0.005 to 2 microns.

17. A low fluid loss composition as defined in claim 14 characterized further in that from 0.015 to 0.06 pound of sodium postdodecylbenzene sulfonate per gallon of petroleum oil are used to suspend the sodium sulfate in the petroleum oil.

18. A low fluid loss composition comprising a major portion of petroleum oil having dispersed therein at least .0025 pound of finely divided sodium chloride per gallon of petroleum oil, the size of individual particles of sodium chloride ranging from 0.005 to 2 microns, from 0.015 to 0.06 pound of sodium postdodecylbenzene sulfonate per gallon of petroleum oil, and from 0.01 to 0.06 pound of sodium dodecylbenzene sulfonate per gallon of petroleum oil.

19. A low fluid loss composition comprising a major portion of petroleum oil having dispersed therein .0025 pound of finely divided oil-insoluble solid per gallon of petroleum oil, the size of the individual particles of said solid ranging from 0.005 to 2 microns, from 0.015 to 0.06 pound of a metal soap of a naphthenic acid per gallon of petroleum oil, and from 0.01 to 0.06 pound of sodium stearate per gallon of petroleum oil.

20. In a process of working a well wherein a petroleum oil is forced into the well bore under pressure, the method of sealing subsurface formations traversed by the well bore against loss of appreciable amounts of the said oil to the formations, which comprises incorporating in said oil an additive containing at least 0.01 pound of an "agglutinant" per gallon of oil, and a sufficient amount of finely divided oil insoluble solid particles varying from 0.005 to 2 microns in size to reduce the fluid loss of the resulting composition to less than 44 ccs. in thirty minutes as determined by the Standard Field Procedure for Testing Drilling Fluids, Section IV, API Test RP29, May 1950, and contacting the faces of the subsurface formations exposed to the well bore with said oil having said additive incorporated therein.

21. In a process of working a well wherein a petroleum oil is forced into the well bore under pressure, the method of sealing subsurface formations traversed by the well bore against loss of appreciable amounts of said oil to the formations, which comprises incorporating in said oil an additive containing at least 0.01 pound of an "agglutinant" per gallon of oil, and at least 0.0025 pound per gallon of oil of finely divided oil insoluble solid particles varying in size from 0.005 to 2 microns, but sufficient in amount to reduce the fluid loss of the resulting composition to less than 44 ccs. in thirty minutes as determined by the Standard Field Procedure for Testing Drilling Fluids, Section IV, API Test RP29, May 1950, and contacting the faces of the subsurface formations exposed to the well bore with said oil having said additive incorporated therein.

22. In a process of working a well wherein a petroleum oil is forced into the well bore under pressure, the method of sealing subsurface formations traversed by the well bore against loss of appreciable amounts of said oil to the formations, which comprises incorporating in said oil an additive containing at least 0.01 pound of an "agglutinant" per gallon of oil, and not more than about 0.20 pound per gallon of said oil of a finely divided oil insoluble solid of such fineness as to provide at least 0.0025 pound per gallon of oil of particles varying in size from about 0.005 to about 2 microns, and contacting the faces of the subsurface formations exposed to the well bore with said oil having said additive incorporated therein.

23. In a process of working a well wherein a petroleum oil is forced into the well bore under pressure, the method of sealing subsurface formations traversed by the well bore against loss of appreciable amounts of said oil to the formations, which comprises incorporating in said oil an additive containing at least 0.01 pound of an "agglutinant" per gallon of oil, and not more than 0.20 pound per gallon of said oil of a finely divided oil insoluble solid of such fineness that about 35% of the particles vary in size from about 0.005 to 2 microns, and contacting the faces of the subsurface formations exposed to the well bore with said oil having said additive incorporated therein.

24. In a process of working a well wherein a petroleum oil is forced into the well bore under pressure, the method of sealing subsurface formations traversed by the well bore against loss of appreciable amounts of said oil to the formations, which comprises incorporating in said oil an additive containing at least 0.01 pound of an "agglutinant" per gallon of oil, at least 0.0025 pound per gallon of oil of finely divided oil soluble solid particles varying in size from 0.005 to 2 microns, but sufficient in amount to reduce the fluid loss of the resulting composition to less than 44 ccs. in thirty minutes as determined by the Standard Field Procedure for Testing Drilling Fluids, Section IV, API Test RP29, May 1950, and a sufficient amount of an oil-soluble dispersing agent to hold said solids in suspension in the oil, and contacting the faces of the subsurface formations exposed to the well bore with said oil having said additive incorporated therein.

25. In a process of working a well wherein a petroleum oil is forced into the well bore under pressure, the method of sealing subsurface formations traversed by the well bore against loss of appreciable amounts of said oil to the formations, which comprises incorporating in said oil an additive containing at least 0.01 pound of sodium dodecylbenzene sulfonate per gallon of oil, at least 0.1 pound of finely divided sodium sulfate per gallon of oil, with a sufficient portion of sodium sulfate particles being less than 2 microns in size to reduce the fluid loss of the resulting composition to less than 44 ccs. in thirty minutes as determined by the Standard Field Procedure for Testing Drilling Fluids, Section IV, API Test RP29, May 1950, and a sufficient amount of a sodium post-dodecylbenzene sulfonate for suspending the sodium sulfate in the oil, and contacting the faces of the subsurface formations exposed to the well bore with said oil having said additive incorporated therein.

References Cited in the file of this patent

UNITED STATES PATENTS

| | | |
|---|---|---|
| 2,573,959 | Fischer | Nov. 6, 1951 |
| 2,652,370 | Wisherd | Sept. 15, 1953 |
| 2,661,334 | Lummus | Dec. 1, 1953 |
| 2,667,224 | Howard | Jan. 26, 1954 |
| 2,667,457 | McChrystal | Jan. 26, 1954 |
| 2,679,478 | Fischer et al. | May 25, 1954 |
| 2,687,175 | Johnson | Aug. 24, 1954 |
| 2,696,468 | Fischer | Dec. 7, 1954 |
| 2,724,439 | Brainerd | Nov. 22, 1955 |

FOREIGN PATENTS

| | | |
|---|---|---|
| 471,637 | Great Britain | Sept. 8, 1937 |